United States Patent
Vigen

(10) Patent No.: US 7,433,264 B2
(45) Date of Patent: Oct. 7, 2008

(54) METHODS AND SYSTEMS FOR DETERMINATION OF VERTICAL CORRECTION OF OBSERVED REFLECTION SEISMIC SIGNALS

(75) Inventor: Erik Vigen, Honefoss (NO)

(73) Assignee: WesternGeco L.L.C., Houston, TX (US)

( * ) Notice: Subject to any disclaimer, the term of this patent is extended or adjusted under 35 U.S.C. 154(b) by 59 days.

(21) Appl. No.: 11/083,669

(22) Filed: Mar. 18, 2005

(65) Prior Publication Data
US 2006/0209634 A1 Sep. 21, 2006

(51) Int. Cl.
*G01V 1/38* (2006.01)
(52) U.S. Cl. .............................. 367/16; 367/15; 367/19; 342/357.07; 342/357.08
(58) Field of Classification Search .................. 367/15, 367/16, 19, 21, 24; 342/357.07, 357.08
See application file for complete search history.

(56) References Cited

U.S. PATENT DOCUMENTS

| | | | | |
|---|---|---|---|---|
| 5,784,335 | A * | 7/1998 | Deplante et al. | 367/72 |
| 5,828,336 | A | 10/1998 | Yunck et al. | |
| 5,910,789 | A * | 6/1999 | Vigen | 342/357.03 |
| 6,529,445 | B1 * | 3/2003 | Laws | 367/151 |
| 6,657,585 | B1 * | 12/2003 | Kucik | 342/357.06 |
| 6,839,302 | B2 * | 1/2005 | Austad et al. | 367/19 |
| 6,873,571 | B2 * | 3/2005 | Clayton et al. | 367/144 |
| 6,954,175 | B1 * | 10/2005 | Cox | 342/357.07 |
| 2002/0064092 | A1 | 5/2002 | Nishimura | |
| 2004/0228214 | A1 * | 11/2004 | Tulett | 367/15 |

FOREIGN PATENT DOCUMENTS

| | | | |
|---|---|---|---|
| GB | 2379741 A | 3/2003 | |
| WO | WO03100451 | * | 12/2003 |

OTHER PUBLICATIONS

Kouba, et al. "GPS Precise Point Positioning Using IGS Orbit Products." Geodetic Survey Division, Natural Resources Canada, Sep. 2000.*

(Continued)

*Primary Examiner*—Jack W Keith
*Assistant Examiner*—Scott A Hughes
(74) *Attorney, Agent, or Firm*—Ari Pramudji; Liangang (Mark) Ye; Jeffrey E. Griffin

(57) ABSTRACT

Methods and systems for determining position of seismic sources and receivers are disclosed. Signals received by a first antenna are processed to determine its 3D coordinate position. Signals received by the first antenna and a second antenna are combined and processed to estimate a spatial vector between the first and second antennas. The spatial vector is added to the 3D coordinate position of the first antenna to provide a 3D coordinate position of the second antenna. Using the 3D coordinate position of the second antenna, a 3D coordinate position of a seismic source unit or receiver may be calculated, as well as a vertical correction for reflected seismic signals received by the receiver. This abstract allows a searcher or other reader to quickly ascertain the subject matter of the disclosure. It will not be used to interpret or limit the scope or meaning of the claims. 37 CFR 1.72(b).

21 Claims, 2 Drawing Sheets

OTHER PUBLICATIONS

Farah, A. "IGS-global ionospheric maps for accurate computation of GPS single- frequency ionospheric delay-simulation study." 34th COSPAR Scientific Assembly, The Second World Space Congress, held Oct. 10-19, 2002 in Houston, TX, USA., meeting abstract.*

Laws, R., & Kragh, E. (2002). Rough seas and time-lapse seismic. *Geophysical Prospecting*, 50(2), 195-208.

Laws and Kragh, "Rough seas and time-lapse seismic," *Geophysical Prospecting*, 50:195-208, 2002.

UK Search Report dated Jul. 12, 2006 for Application No. GB 0605309.4.

* cited by examiner

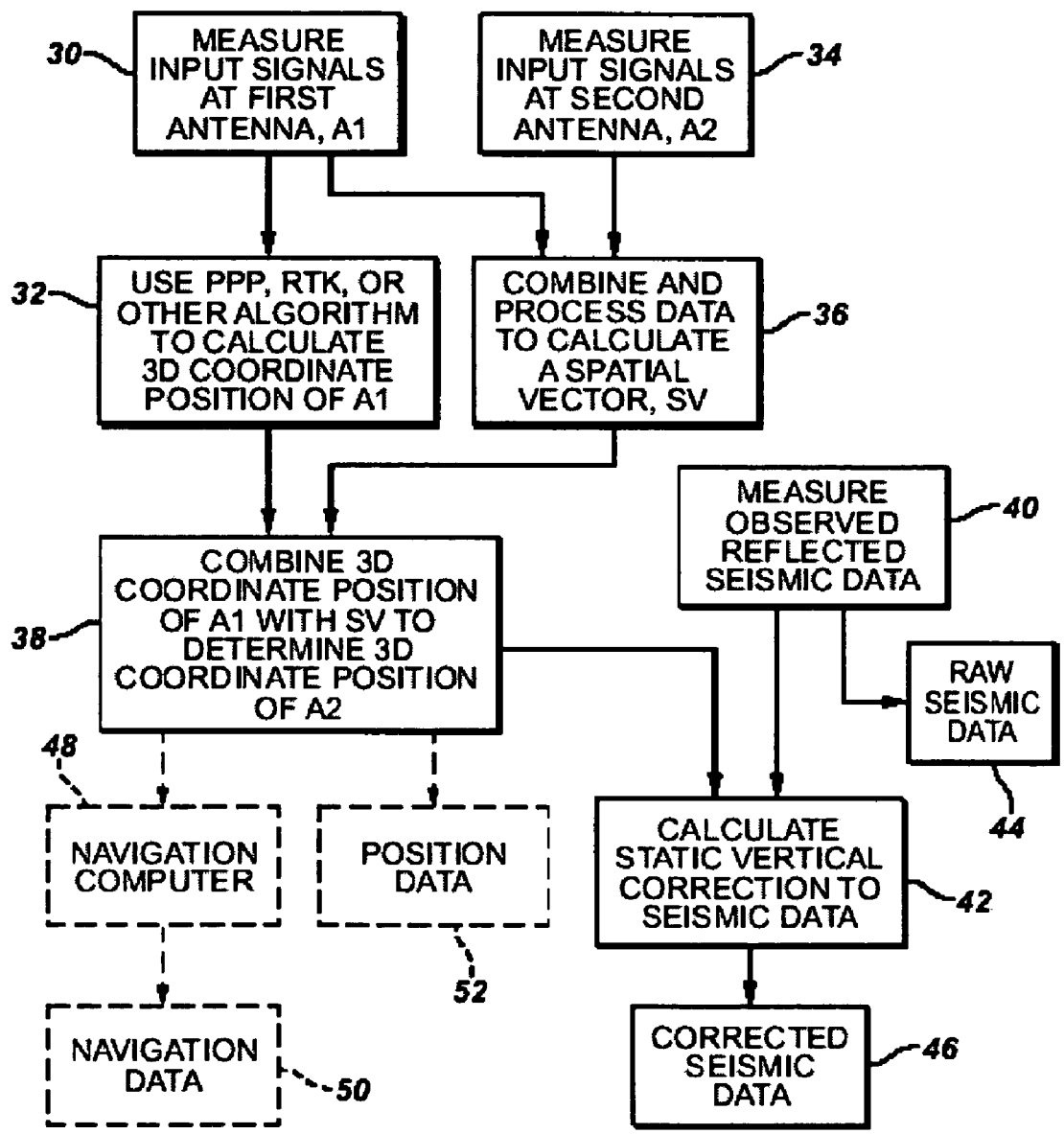

METHODS AND SYSTEMS FOR DETERMINATION OF VERTICAL CORRECTION OF OBSERVED REFLECTION SEISMIC SIGNALS

BACKGROUND OF THE INVENTION

1. Field of Invention

The present invention relates generally to the field of position determination using Global Positioning, and more specifically to using Global Positioning to correct seismic data in light of vertical movements of sources and receivers in marine environments.

2. Related Art

Marine seismic exploration investigates and maps the structure and character of subsurface geological formations underlying a body of water. One or more streamer cables containing seismic receivers is deployed into the water behind a vessel, and one or more sources may be towed by the same or different vessel. Less than perfect knowledge of the actual positions of the source at the time of firing and receivers at the time of arrival of reflected seismic waves may result in less than acceptable seismic data.

When doing marine seismic imaging of the subsurface strata one needs to establish the position and depth of the seismic source and the receivers. Conventionally they have been referenced to the sea surface, but this has the disadvantage that the actual surface varies up and down with time and it is thus at a different distance from the seabed at the different times of the seismic experiments. This invention offers methods to measure the vertical position without reference to the actual sea surface. This allows the seismic data to be corrected for the wind driven sea surface waves, which the source (to a first approximation) rides up and down on, as well as for tidal waves. It has been shown that this effect is important for time-lapse applications using modeling studies. Laws, R. et. al., *Rough Seas and Time-lapse Seismic*, Geophysical Prospecting, 50, 195-208 (2002).

The Global Positioning System (GPS), administered by the United States, is a satellite-based positioning system useful in marine seismic exploration, and seismic surveys may employ multiple GPS receivers at strategic points in a spread to determine the surface position of a vessel, or buoys tethered to streamers and sources. However, this still does not provide knowledge of the actual position of the receivers on the streamers and the sources, as they are not at the surface. Thus, while GPS has been used for surface positioning in marine seismic data acquisition, its use for accurately determining actual vertical position of sources and receivers is not known.

From the above it is evident that there is a need in the art for improvement in determining the vertical position of seismic sources and receivers in fluid media. This would in turn enhance precision of vertical corrections for observed reflected seismic signals.

SUMMARY OF THE INVENTION

In accordance with the present invention, apparatus, systems and methods are described to determine position of seismic sources and receivers, and using this information for determining vertical correction of observed reflected seismic signals. Apparatus, systems and methods of the invention reduce or overcome problems with previous apparatus, systems and methods, and may be used to collect marine seismic data, for example 3-D and 4-D (time lapse) marine seismic data.

A first aspect of the invention is a method comprising:
(a) processing position measurement signals received by a first antenna on a first marine seismic spread component to determine a 3D coordinate position of the first antenna;
(b) receiving position measurement signals by a second antenna;
(c) combining the measurement signals received by the first and second antennas and processing a combined data set to estimate a spatial vector between the first and second antennas;
(d) adding the spatial vector to the 3D coordinate position of the first antenna to provide a 3D coordinate position of the second antenna;
(e) using the 3D coordinate position of the second antenna to calculate a 3D coordinate position of a seismic source unit or receiver; and
(f) calculating a vertical correction for reflected seismic signals received by the receiver.

Methods of the invention include those methods wherein the 3D coordinate position of the second antenna are used to calculate the position and/or orientation of a spread component, such as a float, source units such as air-guns, streamers, and individual receivers or groups of receivers in the streamers. The methods may also include receiving of sufficient signals by multiple positioning system transmitters, which may be multiple satellite positioning system transmitters. The satellite positioning system, if used, may be selected from any functioning system, or future functioning system, or alliance of systems.

Methods in accordance with the invention include those wherein the first spread component is a surface vessel, and the second spread component is selected from any spread component on the water surface, such as a source float, a buoy, or another vessel. The antennas may be any antennas able to detect electromagnetic waves. The first antenna may be located at a position substantially free from interference, wherein the phrase "at a position substantially free from interference" means the antenna has reduced susceptibility to waves, water spray, wakes, and the like, which are more prevalent for unprotected antennas located close to the sea surface. The antennas may be capable of receiving signals from multiple positioning system transmitters, including multiple satellite positioning system transmitters. The satellite positioning system, if used, may be selected from any functioning system, or future functioning system, or alliance of systems. Methods of the invention include those having a plurality of antennas on a float from which a plurality of source units (air-guns or other devices capable of producing acoustic signals, such as vibrators, explosives, dropped weights, and the like) are suspended or connected. The source units may be hung from or otherwise located below the floats by known distances, for example by chains or ropes of known distance, or solid members of known distance. In this way the. position and orientation of the floats and the source units will be known in an Earth-fixed reference frame independent of the sea level or wave action.

The calculation unit may be or include an on-board computer or remote computer, and may include software to provide one or more mathematically described surfaces. A telemetry system adapted to transmitted data between the receivers and the calculation unit is employed, which may operate through wired connections, fiber optic connections, wireless, acoustic communication, or any combination thereof. Once the position (3D coordinates) of the second spread component, such as source units attached to a float, or receivers in a streamer, are known in an Earth-fixed reference frame independent of the sea level or wave action, then the positions (3D coordinates) of the source units and/or receivers may be given relative to a mathematically described surface. Examples of such surfaces include an ellipsoid fitted to the Earth and a geiod model defined by a mathematical formula and corresponding parameters. The calculation unit may employ one or more algorithms of the kind known as "Precise Point Positioning (PPP)" or "Long Range Real-Time Kinematic (RTK)", or combination thereof, or combined with other algorithms. A straight RTK algorithm may also be used, but the operational radius of the seismic survey vessel would then be limited to a 10-20 km radius from a Global Navigation Satellite System (GNSS) base station, such as base stations for those systems known as GPS, GLONASS, GALILEO, and the like. The calculation unit may also use precise satellite ephemeries or orbital corrections available for the PPP algorithm, or the base station data in the case of Long Range RTK or RTK. The algorithms are to some extent published, and a person skilled in the art of precise satellite positioning will be able to create the complete algorithm without undue experimentation. Furthermore, the exact algorithm used for position determination is not important. As time passes, other satellite positioning systems will no doubt emerge, having their own sets of signals; older satellite positioning systems, for example GPS, may be updated and modernized with new and/or more signals. These foreseeable newer and perhaps modernized positioning systems and algorithms to implement them are considered useful functional substitutes in the methods and systems of the present invention.

The first antenna may be mounted in or on a vessel mast, for example, or a dedicated pole having a height above the deck or bridge of the vessel, to be substantially free from the effects of multipath due to signals reflected off surfaces on the vessel, and signal obstruction caused by vessel superstructure, which might interfere with reception of signals from the transmitters from which it is receiving signals. The first and second antennas may receive at more than one frequency. For example, at least the first antenna may be selected to receive both the $L_1$ and $L_2$ frequencies used by the GPS. This would allow the calculation unit to employ any calculation algorithm sufficient to cancel errors caused by ionospheric refraction delay and provide an even more precise estimate of the 3D coordinates of the first antenna, and ultimately a more precise estimate of the position of the second antenna, and devices attached thereto at known lengths.

In similar fashion, one or more antennas may be placed on floats or buoys tethered to streamers, where the tethers have known lengths, allowing positioning of the streamers using the methods described to calculate a spatial vector between the vessel antenna and the antenna on the streamer buoy. Or the reverse may be used, where the initial 3D coordinates of a streamer buoy antenna and a vessel antenna (or source float antenna) are measured, more accurate 3D coordinates calculated for the streamer buoy antenna, then a spatial vector between streamer buoy antenna and vessel antenna (or source float antenna) calculated, then use the more accurate position of the streamer buoy antenna and the initial measured vessel (or source float) antenna 3D coordinates to more accurately estimate the position and orientation of the vessel (or source float) antenna.

Another method of the invention comprises:
(a) processing position measurement signals received by one or more antennas on a marine seismic source float to determine 3D coordinate positions of each antenna;
(b) using the 3D coordinate positions of the one or more antennas to calculate 3D coordinate positions of one or more seismic source units attached to the float in known geometry; and
(c) calculating a vertical correction for reflected seismic signals received by seismic receivers receiving the reflected seismic signals originated by the one or more source units.

A second aspect of the invention is a system comprising:
(a) a first antenna mounted on a first marine seismic spread component;
(b) a second antenna; and
(c) a calculation unit adapted to receive input data of the 3D coordinates from the first and second antennas and determine a 3D coordinate position of the second antenna using the input data and an algorithm selected from a precise point positioning algorithm and a real time kinematic algorithm.

The first marine seismic spread component may be a vessel, which may be towing an entire spread (source and streamers), or only a source or only the streamers, with a second vessel towing the complimentary equipment. Systems of the invention may include sub-systems on the vessel such as navigation computers, positioning computers, and the like. The vessel may include one or more transmitters, for example for use in acoustic positioning, communications modules allowing communication between the vessel and a remote location or another vessel.

Alternative systems of the invention include those wherein the first and second antennas are both mounted on the same spread component, such as a source float.

Methods and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIG. 4 is a logic diagram illustrating some of the features of the invention.

Figure 1:
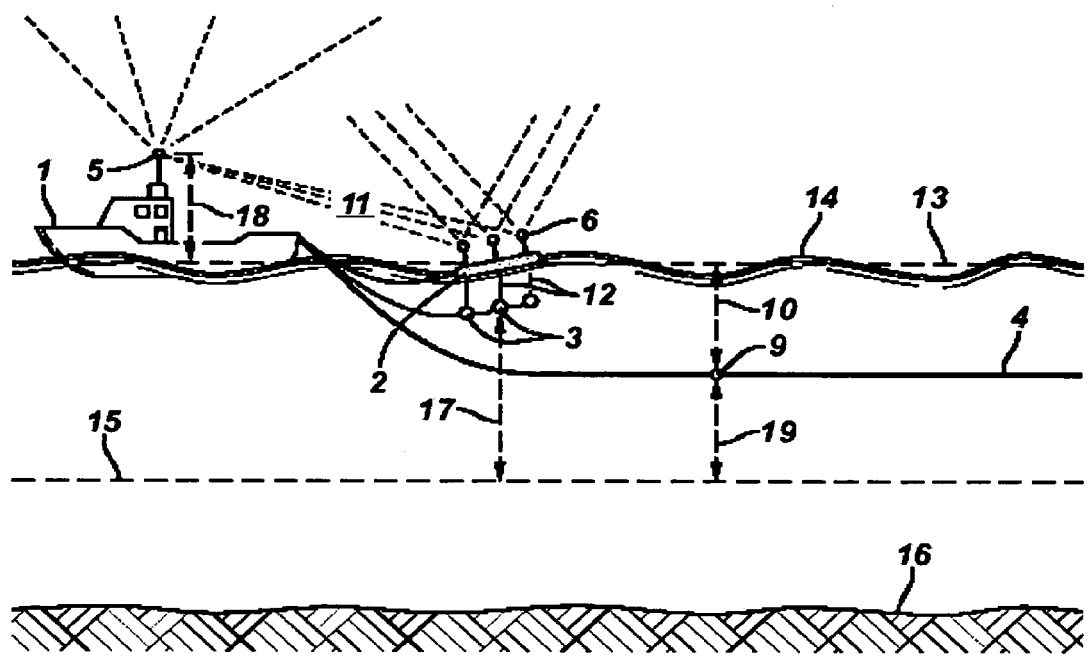
FIG. 1 is a schematic illustration of one embodiment of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes methods and systems for determining vertical position of marine seismic components, in particular seismic signal source units, in reference to a mathematically described surface rather than the sea surface. As used herein the term "source unit" means an individual air-gun or other acoustic wave-origination device, such as an explosive charge. The seismic data is normally organized in lines, and in 3D seismic as well as in 4D the data from adjacent lines needs to be given a common reference in order to yield the best precision. Two adjacent lines may be acquired at different time of day and at different days, and the sea surface is then most certainly at different level at the two epochs. The sea level is affected by external forces, such as astronomical and meteorological tides, air pressure, currents, wind, to name a few. To some degree of accuracy it may be possible to compensate for the effect of astronomical tides based on data from tide tables. Although the astronomical tide can be predicted very accurately for periods of several years the accuracy is often dramatically reduced as the data needs to be extrapolated from the tabled port nearest to the survey area using inaccurate models to estimate time shift and amplitude of the tide. The other effects are hardly predictable at all.

The conventional way of determining the depth of the seismic source and receivers is by use of chains of known lengths connecting them to a flotation device as one method. This is commonly used for air-gun sources. An alternative is to use pressure gauges to determine the water column above the device, and this is the commonly used method for receivers and receiver cables. They both fall short in that they just provide a depth relative to the actual sea surface. There is no means by which the vertical reference can be re-established with any degree of accuracy months and years later as is required in for instance time lapse seismic surveys (4D seismic).

Given that the vertical distance of the source and the receivers from a fixed horizontal reference surface (or datum) could be measured it would be possible to refine the accuracy of the vertical correction of the seismic signals. This invention offers methods, apparatus, and systems to determine these values in a reference frame fixed to the Earth and being independent of the actual level of the sea surface.

Figure 2:
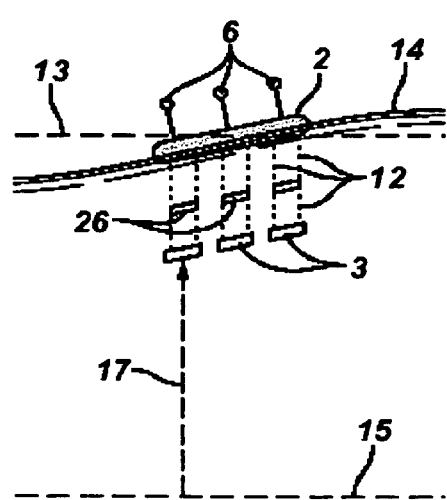
FIG. 2 is a schematic side elevation view of a source float showing one possible antenna location in accordance with the invention.

Referring now to the figures, FIG. 1 illustrates schematically and not to scale a system and method of the invention, including a vessel 1, a source float 2 having air-guns 3 suspended from float 2 by chains 12, as more easily seen in FIG. 2, and a streamer cable 4. Those of skill in the art will realize many variations, and this is but one way of obtaining marine seismic data. Vessel 1 includes an antenna 5 connected to a receiver (not shown). Antenna 5 may be positioned on a mast or other extension of the vessel, which may reduce the antenna's exposure to waves, water spray, wakes, and the like. Three antennas 6 are depicted on source float 2. A calculation unit 7 processes data as will be discussed herein in more detail. The height or depth of a water column is depicted as 10. The average sea level is indicated by a dotted line 13, and the actual sea level at 14. A mathematically derived surface is indicated at 15, and the seabed is indicated at 16. Derived surface 15 could be above or below the sea surface 14. As illustrated, a dotted line 17 indicates height or depth of air-guns 3 above mathematical surface 15, while a dotted line 19 indicates height or depth of streamer 4 above mathematical surface 15. Also shown is a dotted line 18 indicating a known or measured height of vessel antenna 5 above average sea level 13.

Lines coming from above antennas 5 and 6 indicate transmitted signals from a positioning system, such as the Global Positioning System satellites, although the invention is not limited to the GPS system, or even to satellite positioning systems. As mentioned previously, apparatus and systems in accordance with the invention may be apparatus wherein the antennas are able to receive and/or transmit electromagnetic waves. An antenna may be a metallic apparatus for sending or receiving electromagnetic waves, while a "receiver" is a component that converts electrical signals received at the antenna into sounds and/or visual readouts, and vice versa. Antennas useful in the invention may be capable of receiving signals from multiple satellite positioning system transmitters. The satellite positioning system, if used, may be selected from any functioning system, or future functioning system, or alliance of systems, including, but not limited to the Global Positioning System operated by the United States; the European Union's system known as GALILEO; Russia's system known as GLONASS; Japan's system known as the QUASI-ZENITH SATELLITE SYSTEM, and China's system known as TWINSTAR. New satellite navigation systems continue to be designed and no doubt will be launched during the term of this patent. Satellite positioning system alliances have formed, and probably will continue to be formed, and a number of countries are funding new systems, since GPS chipsets are increasingly smaller and cheaper, lending themselves to new applications. All of these systems and algorithms to implement them are foreseeable functional equivalents and considered within the invention.

Antennas 5 and 6 may be connected to receivers capable of receiving single, dual, or multiple frequencies, such as either one or both the $L_1$ and $L_2$ frequencies used by the GPS. Using dual frequencies would allow calculation unit 7 to employ any calculation algorithm sufficient to cancel errors caused by ionospheric refraction delay and provide an even more precise estimate of the spatial vector, including those algorithms known as "Precise Point Positioning (PPP)", "Long Range Real-Time-Kinematic (RTK)", or, in limited cases, a straight RTK algorithm. When using dual frequency data from both receivers (5 and 6) it is possible to compensate for the ionosphere at the cost of not doing integer fixing of the cycle ambiguities. For short distances (i.e. within 10-20 km) it is normally beneficial to do integer fixing and leave the ionospheric compensation to less accurate methods like using models. The dual frequency information may be used to the benefit of faster resolution of the integer ambiguities though. This means that the receiver 6 may be a single or dual frequency receiver. If using a straight RTK algorithm to position antenna 5 one may use dual frequency to maximize the operable distance from the base station onshore and to speed up the ambiguity resolution time, but not for ionospheric compensation. PPP performs position determination based on the processing of un-differentiated code and carrier phase data from a single GNSS receiver, integrated with widely-available precise satellite orbit and clock products, provided, e.g.

by the IGS. PPP implies single receiver positioning. Single-frequency observations might be employed if multipath variations are low. In other words, in cases where an observation has low multipath variations single frequency ionosphere-free PPP solutions may be equivalent to the dual-frequency solutions. Unlike in relative positioning, common mode errors do not cancel in PPP. Station movements that result from geophysical phenomena such as tectonic plate motion, Earth tides and ocean loading enter the PPP solution in full, as do observation errors resulting from the troposphere and ionosphere. Relevant satellite specific errors may be satellite clocks, satellite antenna phase center offset, group delay differential, relativity and satellite antenna phase wind-up error. Receiver specific errors may include receiver antenna phase center offset and receiver antenna phase wind-up. With RTK, one can establish a base (or reference) station at a known point and broadcast the data from the reference station to another antenna or receiver. A computer combines the reference station data with the second antenna data. With low noise dual frequency receivers, only a few epochs of data are typically required to fix the ambiguities associated with the GNSS phase data observable and compute a GNSS baseline; the difference in latitude, longitude and height between the reference antenna and second antenna.

Completing FIG. 1 is a calculated spatial vector 11 (three spatial vectors 11 are depicted, depending on which antenna 6 is chosen), calculated by calculation unit 7 combining and processing signals received by antennas 5 and one of antennas 6, as further explained in the Example herein below. Knowing the 3D coordinate position of antenna 5 and spatial vectors 11 allows the 3D coordinate positions of antennas 6 to be determined, thus allowing position and orientation of float 2 to be determined. Also, since the length of chains 12 is known, the vertical position of air-guns 3 or other acoustic source units is well establish, at least in reference to mathematical surface 15, as indicated by dotted line 17. Of course, the number of antennas 6 is not critical if the geometry of the source is known. For example, one antenna 6 may be sufficient to calculate the 3D coordinate positions of three or more air-guns if all physical dimensions of a source are known. It is only out of convenience that FIG. 1 depicts one antenna 6 per source unit (air-gun) 3.

FIG. 2 illustrates more clearly three antennas 6 attached to float 2, and air-guns 3 attached via chains 12 and plates 26 to float 2. It may readily be seen that knowledge of the surface position of antennas 6, combined with knowledge of the length of chains 12, position of average sea level 13 and/or mathematical surface 15, will provide a very precise position of air-guns 3 without reference to the actual sea level 14.

Figure 3:
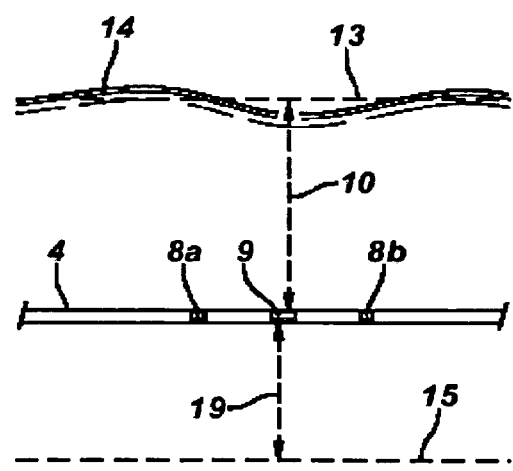
FIG. 3 is a schematic side elevation view of a streamer and receivers whose position may be determined by the methods an systems of the invention.

FIG. 3 is a side elevation view of a streamer and receivers whose position may be determined by the methods and systems of the invention. Illustrated schematically is a streamer 4 having point or groups of receivers 8a and 8b. Knowing the average sea level 13 near the vessel 1 (FIG. 1), and assuming steamer 4 is only a few kilometers long, it is possible to estimate with great confidence the average sea level 13 at various positions along the streamer. This information may be used with readings from a pressure gauge 9 to determine the average depth of streamer 4, and receivers 8a and 8b. Moreover, since the distance between average sea level 13 and mathematical surface 15 is known, it is easy to determine the distance 19 equal to the vertical distance of receivers 8a and 8b above mathematical surface 15.

FIG. 4 is a logic diagram illustrating some of the features of the invention. Signals from two antennas are measured at 30 and 34, such as by reception of signals from GNSS satellites. A 3D coordinate position of one antenna, A1, is calculated at box 32 using a correction algorithm, for example PPP, Long range RTK, and the like. Measured input signals from A1 and a second antenna, A2, are combined and processed by a calculation unit represented by box 36 to calculate a spatial vector, SV. The 3D coordinate position of A1 from box 32 is combined with spatial vector SV as represented by box 38 to determine a 3D coordinate position of A2. It will be understood that all calculations represented by boxes in FIG. 4 may all be carried out by the same computer. The 3D coordinate position of A2 is then used to calculate, at box 42, a static vertical correction to measured seismic data 40. The 3D coordinate position of A2 (or more precisely, of a source unit connected in known geometry to A2) may be sent to a navigation computer 48, which may use the calculated 3D coordinate position data to make corrections in navigation, for example of a vessel, and may store this as navigation-data, 50. The 3D coordinate positions may be stored, as represented by box 52. The 3D coordinate positions of the antennas may be used in conjunction with measured observed reflected seismic data, 40, to calculate more accurate seismic data, 42, for example through elimination of ghost signals. The measured observed seismic data may be stored as raw seismic data at 44, and the corrected seismic data may be stored at 46 and may be accessible for future time-lapse seismic surveys.

The following non-limiting example referring to FIGS. 1 and 2 will further illustrate the invention in operation. The invention is based on the use of GPS or other positioning system to provide 3D positions of antennas mounted on vessel 1 and on floats 2 from which air-guns 3 are suspended. A typical outfit for marine seismic acquisition also has one or more receiver cables 4 towed behind the vessel 1. In this embodiment of the invention, one GPS antenna and receiver system 5 is mounted in the vessel's mast, and three GPS antenna and receiver systems 6 are mounted on source float 2. A computer onboard vessel 1 fitted with the necessary software to perform the required calculation is present, as well as telemetry systems to transfer the observed GPS measurements from receivers 5 and 6 to computer 7. Pressure gauges at one or more locations in the cable 4 that can measure the height of the above water column 10 are provided. Given the embodiments as described, one process of determining the depth (or height) of the seismic devices is described in the following.

1. The measurements from the vessel antenna 5 and its receiver are processed on computer 7 to provide an accurate 3D position estimate of that antenna's position for any given time when measurements exist. Antenna 5 and its receiver should be capable of taking measurement on both of the GPS frequencies $L_1$ and $L_2$. That enables the use of a computation method to cancel the error caused by ionospheric refraction delay. Alternatively, rather than using dual frequencies, one may use L1 only and correct for the ionosphere by other means, for example a model, although these may not yet have the desired accuracy. Monitoring systems with broadcasts of the observed effect have also been proposed. The algorithm implemented on the computer may be any of the kinds known as "Precise Point Positioning (PPP)", "Long Range RTK", or other algorithm or combination of algorithms. A straight RTK algorithm could also work, but the operational radius of the seismic survey vessel would then be severely limited, 10-20 km radius from a GPS base station. The computation also requires that precise GPS satellite ephemeries or orbital corrections are available for the PPP algorithm or the base station data in the case of Long Range RTK or RTK. The algorithms are to some extent published, and a person skilled in the art of precise satellite positioning will be able to create a complete algorithm. Ephemeries and corrections are available on the Jet Propulsion Laboratory (JPL) web site, and JPL has patented how to determine the corrections, U.S. Pat. No. 5,828,336.

2. The measurements from a first one of antenna 6 and its receiver on source float 2 is combined with the measurements from vessel antenna 5 and its receiver and processed on computer 7. It benefits the process if the measurements delivered from the GPS receivers are synchronized in time. Most modern GPS receivers will deliver synchronized data. The combined data can, through the computer processing, provide an estimated spatial vector 11. The method may use a so-called Real-Time-Kinematic (RTK) algorithm that makes a precise estimate based on the measurements of the phase of the carrier frequency signal. This method is widely published and a person skilled in the art of precise GPS positioning will be able to adapt the published methods to this application. Most of the published material is based on the assumption that one of the antennas are located at a fixed and known location where as this application has a well estimated vessel antenna 5 location after step 1 has been carried out, but it is not stationary. The RTK processing may benefit if the receiver associated with float antenna 6 and the receiver associated with vessel receiver 5 provide dual frequency measurements, but it is not required as the distance between the antennas will normally be a few hundred meters only. (If the first antenna is a float antenna, such as antenna 6, and a second source float antenna 6' is the second antenna, then one might use steps 1 and 2 to determine 3D coordinate positions of all of the source float antennas.)

3. The produced spatial vector 11 is added to the position estimated for the vessel antenna 5 to give an accurate 3D position of the first chosen antenna among the units 6 on float 2.

4. Steps 2 and 3 are repeated for each of the remaining antennas 6 on float 2 where the first chosen antenna takes the place of vessel antenna 5 in the calculations. The measurements from the receivers associated with each float antenna 6 can be combined in any order as long as all produced vectors are connected to yield a position estimate for each antenna 6. Any one of them may be chosen as the first receiver antenna to produce a vector 11 from vessel antenna 5 to float 2.

5. If there is more than one source float or more than one source, step 4 is repeated until all antennas in the survey spread have been covered. It is normally preferred to choose measurement combinations so that the lengths of the produced vectors are short. If the distance between two floats or two sources is smaller than the distance from the vessel to the float or source it is thus preferable to use the nearest float or source as base for the first vector to a new float. This is not a requirement though, and steps 2 through 4 may as well be used for each float or source.

6. Instead of steps 2 through 5 it is possible to use only step 1 for each antenna 6. In certain embodiments, antennas 6 mounted very close to the sea level may be susceptible to signal tracking problems due to water spray and waves flooding the antenna that will intermittently block the signals. When this happens the method used in step 1 may suffer from a far longer swing in time than the method applied in step 2 requires, perhaps up to an hour versus a minute or less. Vessel antenna 5 is normally not susceptible to such tracking problems as the antenna site has been carefully chosen.

7. The position estimate provided for all float antennas 6 defines the accurate location and orientation of source float 2.

8. The positions of air-guns 3 can then be calculated in consideration of the source geometry and the known lengths of chains 12.

9. The positions provided in step 8 will be given in an Earth-fixed reference frame independent of sea level 14. They may be transformed into a form where the height (or depth) 17 relative to a mathematically described surface 15 can be given. Examples of such surfaces are an ellipsoid fitted to the Earth or a geoid model defined by a mathematical formula and corresponding parameters.

10. The method will give an accurate estimate of the height/depth of an air-gun 3, and it may also give a fairly accurate horizontal position of it. The horizontal components will normally suffer because of the way air-guns 3 are suspended from float 2. Chains 12 holding air-guns 3 will on average be aligned with the local gravity vector, but under influence of environmental forces it will deviate from it to some degree. Air-guns 3 are heavy and their weight will to some extent constrain the deviation from the vertical. Under these conditions the vertical component of chain 12 will have far less variation than the horizontal components.

11. Vessel antenna 5 may further be used to estimate the average sea level 13 by use of the known or measured height 18 of antenna 5 above the waterline of vessel 1. It is necessary to model or measure the height 18 to achieve the best accuracy as it will vary with the ballast and trim condition of the vessel. The sea level determined this way will appear to oscillate as vessel 1 is affected by heave motion. A filter, for instance a Kalman filter, can be used to eliminate the effect of the heave and determine the mean level 13.

12. Optionally, one can estimate the tides by use of an advanced filter driven by the sea level values provided in step 11 before the filter. That enables the use of a longer filter constant and refinement of the accuracy.

13. The seismic receiver cable 4 is equipped with pressure gauges 9 at one or more locations, and they measure hydrostatic pressure. This pressure corresponds to the water column above it so that the distance from gauge 9 to the average sea surface 13 may be determined.

14. The reference surface 15 has been chosen so that it with good approximation is parallel to the Earth's and sea surface curvature by using conventional surfaces like an ellipsoid or a geoid model. When the average sea level 13 has been determined at vessel 1 location and the streamer cable is only a few kilometers long it is possible with a high degree of accuracy to also estimate the average sea level 13 above the gauge 9 in the Earth fixed reference frame. From there is it trivial to find the height/depth 19 of streamer 4 in the same reference frame.

A typical use of this invention will be in 4-D geophysical imaging, where a 3-D seismic survey is repeated over a grid that has been previously surveyed. This series of surveys taken at different times may show changes to the geophysical image over time caused, for example, by extraction of oil and gas from a deposit. When acquiring seismic data over weeks and months as is typical for a seismic 3D survey it is important that the whole data set can be referenced to the same level with a precision and certainty. 4D seismic requires data sets acquired at intervals over years to be compared looking for the subtle changes in the subsurface as an oilfield gets produced. Using the methods, apparatus, and systems of the invention, the height or depth of the seismic sources and receivers may be determined with respect to a reference that can be reconstructed with a high degree of precision at any future or past time epoch. This is in contrast to the sea surface referenced data that can only be approximated at a different time given that accurate environmental information is available. It is important that the source members being used to generate the acoustical pulses be located as closely as possible to the same location as in previous surveys over the same grid. This has been difficult to accomplish in a marine survey because the acoustical source members are typically towed behind the tow vessel in source arrays, which are subject to wave and current movement. The present invention makes it possible to monitor the difference and apply a correction for it.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   (a) processing position measurement signals received by a first antenna on a first marine seismic spread component to determine a 3D coordinate position of the first antenna;
   (b) receiving position measurement signals by a second antenna;
   (c) combining the position measurement signals received by the first and second antennas and processing a combined data set to estimate a spatial vector between the first and second antennas;
   (d) adding the spatial vector to the 3D coordinate position of the first antenna to determine a 3D coordinate position of the second antenna; and
   (e) using the 3D coordinate position of the second antenna, the average sea level and a mathematical surface model of the Earth to determine a 3D coordinate position of a seismic source unit or a receiver.

2. The method of claim 1 wherein the step of determining a 3D coordinate position of the second antenna comprises calculating a 3D coordinate position of an antenna on a second spread component selected from a source float, a streamer, a buoy, and a second vessel.

3. The method of claim 1 comprising receiving position measurement signals from multiple positioning system transmitters selected from satellite-based transmitters, land-based transmitters, and combinations thereof.

4. The method of claim 1 comprising locating the first antenna at a position substantially free from interference.

5. The method of claim 1 comprising locating the first and the second antennas on a source float.

6. The method of claim 1 wherein the receiving position measurement signals comprises receiving electromagnetic waves.

7. The method of claim 1 wherein the receiving of position measurement signals by a second antenna comprises receiving a signal by an antenna placed on a float from which one or more source units capable of producing acoustic signals are suspended or connected in known geometry.

8. The method of claim 1 wherein steps (a)-(e) are carried out by an on-board computer or remote computer, including software adapted to provide one or more mathematically described surfaces.

9. The method of claim 8 comprising transmitting data between receivers connected to the antennas and the computer employing a telemetry system, the telemetry system adapted to operate through wired connections, fiber optic connections, wireless electromagnetic transmission, acoustic transmission, or any combination thereof.

10. The method of claim 1, further comprising using the 3D coordinate position of the second antenna to calculate a 3D coordinate position of a seismic source unit in an Earth-fixed reference frame independent of sea level or wave action.

11. The method of claim 1 wherein step (a) comprises using an algorithm selected from a precise point positioning (PPP) algorithm, a real time kinematic (RTK) algorithm, functional equivalents and improvements of PPP and RTK algorithms, combinations of PPP and RTK algorithms, and combinations of PPP and/or RTK algorithms with other algorithms.

12. The method of claim 1 wherein the first spread component is a vessel, and the second antenna is attached to a second spread component comprising one or more floats or buoys tethered to streamers, the tethers having known lengths and optionally one or more receivers, allowing positioning of the streamers and/or the receivers.

13. The method of claim 1 wherein the first spread component is a streamer buoy, and the second antenna is attached to a second spread component selected from a vessel, a source float, and another streamer buoy.

14. The method of claim 1 wherein the first antenna receives at a single frequency and uses an alternate method of compensating for ionosphere delay.

15. The method of claim 1 wherein the first spread component is a vessel that tows equipment selected from a source and streamers, only a source, and only the streamers.

16. The method of claim 1, wherein the 3D coordinate position of the second antenna is determined using the position measurement signals received by the first antenna and the second antenna.

17. The method of claim 1, wherein the 3D coordinate position of the second antenna is determined using an algorithm selected from a precise point positioning algorithm and a real time kinematic algorithm.

18. The method of claim 1, further comprising using the 3D coordinate position of the second antenna to calculate a 3D coordinate position of a receiver in an Earth-fixed reference frame independent of sea level or wave action.

19. The method of claim 1, further comprising using the 3D coordinate position of the first antenna and of the second antenna, the average sea level and a mathematical surface model of the Earth to calculate a vertical correction for reflected seismic signals received by a receiver.

20. The method of claim 19 wherein calculating the vertical correction includes correcting for sea surface reflections.

21. The method of claim 1, wherein the mathematical surface model of the Earth is an ellipsoid model or a geoid model.

* * * * *